(12) United States Patent
Suzuki et al.

(10) Patent No.: US 8,043,686 B2
(45) Date of Patent: Oct. 25, 2011

(54) METHOD OF MOULDING COMPOSITE MEMBER, AND COMPOSITE MEMBER

(75) Inventors: Hitoshi Suzuki, Yokohama (JP); Kyo Nakayama, Yokohama (JP); Takeo Fukumoto, Yokohama (JP); Hajime Sumitomo, Yokohama (JP); Norio Ohsawa, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 219 days.

(21) Appl. No.: 11/912,791

(22) PCT Filed: Apr. 21, 2006

(86) PCT No.: PCT/JP2006/308383
§ 371 (c)(1),
(2), (4) Date: Oct. 26, 2007

(87) PCT Pub. No.: WO2006/118046
PCT Pub. Date: Nov. 9, 2006

(65) Prior Publication Data
US 2009/0075045 A1    Mar. 19, 2009

(30) Foreign Application Priority Data
Apr. 28, 2005   (JP) ................. 2005-131773
Jan. 12, 2006   (JP) ................. 2006-004368

(51) Int. Cl.
*B32B 3/00*   (2006.01)
*B25G 1/10*   (2006.01)

(52) U.S. Cl. ............... 428/172; 428/217; 401/6; 16/430

(58) Field of Classification Search .............. 428/161, 428/172, 217, 36.91; 401/6, 7; 81/489; 16/110.1, 16/430
See application file for complete search history.

(56) References Cited

U.S. PATENT DOCUMENTS
3,525,799 A * 8/1970 Ellis ............................ 174/84 R
5,155,878 A * 10/1992 Dellis .......................... 16/421
5,988,909 A * 11/1999 Luke et al. .................... 401/6
(Continued)

FOREIGN PATENT DOCUMENTS
DE    100 59 065 A1    6/2002
(Continued)

OTHER PUBLICATIONS
International Search Report of PCT/JP2006/308383, date of mailing May 30, 2006.
(Continued)

Primary Examiner — Donald J Loney
(74) Attorney, Agent, or Firm — Westerman, Hattori, Daniels & Adrian, LLP

(57) ABSTRACT

A method of moulding a composite member and a composite member are provided in which a convex part can be formed at one member by moulding the other member integrally to the one member. A concave part 10*a* is provided at least at a part inside a metal mould 10 located on the side opposite the second member fusion bonding surface side of the above-mentioned first member 6*b*, the above-mentioned second thermoplastic material is melted and ejected to the second member fusion bonding surface side of the first member 6*b*, the first member 6*b* is changed in shape by injection pressure of the melted second thermoplastic material, and a convex part 6*a* is formed at the first member.

5 Claims, 11 Drawing Sheets

U.S. PATENT DOCUMENTS

| | | | |
|---|---|---|---|
| 6,158,910 A | 12/2000 | Jolly et al. | |
| 6,328,493 B1 * | 12/2001 | Starchevich | 401/6 |
| 2002/0119270 A1 | 8/2002 | Daniel, Jr. | |
| 2003/0005549 A1 | 1/2003 | DeLuca et al. | |
| 2003/0034414 A1 | 2/2003 | Asano et al. | |
| 2004/0190973 A1 | 9/2004 | Nakayama et al. | |
| 2004/0217555 A1 * | 11/2004 | Willat et al. | 277/645 |

FOREIGN PATENT DOCUMENTS

| | | |
|---|---|---|
| JP | 4-235029 A | 8/1992 |
| JP | 6-48086 A | 2/1994 |
| JP | 7-299984 A | 11/1995 |
| JP | 08-99331 A | 4/1996 |
| JP | 9-212272 A | 8/1997 |
| JP | 2000-317975 A | 11/2000 |
| JP | 2001-138468 A | 5/2001 |
| JP | 2003-512960 A | 4/2003 |
| JP | 2003-320578 A | 11/2003 |
| WO | 01-32439 A1 | 5/2001 |

OTHER PUBLICATIONS

Supplementary European Search Report dated Sep. 22, 2010, issued in corresponding European Patent Application No. 06732191.9.

* cited by examiner (a)

(b)

(c)

(a)

(b)

(c)

(a)

(b)

(c)

(d)

(a)

(b)

(a)

(b)

(c)

(a)

(b)

(c)

METHOD OF MOULDING COMPOSITE MEMBER, AND COMPOSITE MEMBER

TECHNICAL FIELD

The present invention relates to a method of moulding a composite member, and a composite member. For example, it relates to a method of moulding a composite member and a composite member, in which a second member of a thermoplastic material is fusion bonded and moulded integrally to a first member moulded of a thermoplastic material.

BACKGROUND ART

Conventionally, a variety of proposals are made with respect to a method of moulding a composite member. For example, a moulding method proposed in Japanese Patent Publication (KOKOAI) H8-99331 is such that a polypropylene resin is melted and injection moulded in a metal mould to mould a polypropylene member, and the resulting moulded product is inserted into another metal mould, and a thermoplastic elastomer is melted and ejected on a surface of the polypropylene member, whereby a thermoplastic elastomer member is fusion bonded and moulded on the surface of the polypropylene member integrally and three-dimensionally. The composite member including such two materials is such that the thermoplastic elastomer member is formed on one surface of the polypropylene resin.

Further, Published Japanese Translation (KOHYO) No. 2003-512960 discloses that two-component injection moulding (two-shot molding) is carried out using different thermoplastic elastomers to form a grip for a writing instrument of two layers with different hardness.

Patent Document 1: Japanese Patent Publication (KOKOAI) H8-99331
Patent Document 2: Published Japanese Translation (KOHYO) No. 2003-512960

DISCLOSURE OF THE INVENTION

Problems to be Solved by the Invention

Incidentally, situations where the composite member is utilized vary considerably. For example, nowadays, there is a need for one member formed into a bag-shape, inside which the other member is moulded integrally. However, in the above-mentioned conventional moulding method, since the other member is moulded on the outer surface of the one member, the other member cannot be integrally moulded inside the one member which is formed into the bag-shape.

Further, as a social need, there is a need for the composite member in which the other member is integrally moulded inside a convex part of the one member having the convex part and a plate-shape.

This composite mould member can be manufactured by forming the convex part at the one member then the other member is moulded in the above-mentioned convex part.

However, as for the above-mentioned moulding method, there is a problem in that the metal mould in which a concave part corresponding to the convex part is formed must be used as the metal mould for moulding the one member, leading to increase in cost of manufacture.

Furthermore, also as for the shape of the above-mentioned convex part, there is a need for various convex part shapes, the convex part shape must be formed easily and inexpensively.

However, a method of forming various convex part shapes is not disclosed in the above-mentioned patent documents 1 and 2.

Furthermore, the composite member manufactured by the above-mentioned method is attached to a base member by way of fitting, adhesion, etc. Thus, there is a problem in that a fitting process or an adhesion process for attaching the composite member is needed, resulting in increased man-hours.

Means to Solve the Problem

In order to solve the above-mentioned technical problems, the present invention is made and aims to provide a method of moulding a composite member and a composite member in which the other member is formed at one member so that a convex part can be formed at the one member, and the other member is formed inside the one member having a bag-like part so that the one member is swelled to form the convex part.

Further, the present invention aims to provide a method of moulding a composite member and a composite member, in which the composite member is directly formed at the base member to omit the attachment work.

Furthermore, the present invention aims to provide a method of moulding a composite member and a composite member, in which the composite member is directly formed at the base member and can be easily taken out of the metal mould after the formation.

The method of moulding the composite member in accordance with the present invention in order to attain the above-mentioned purpose is a method of moulding a composite member in which a first member formed of an elastic material is mounted in a metal mould, and a thermoplastic material for a second member is melted and ejected to one surface of the above-mentioned first member, to mould the first member and the second member, characterized in that a concave part is provided at least at a part inside the metal mould located on the side opposite the second member formation side of the above-mentioned first member, the above-mentioned thermoplastic material is melted and ejected to the second member formation side of the first member, and the first member is changed in shape by ejection pressure of the melted thermoplastic material, to form a convex part at the first member.

As such, at least a part inside the metal mould located on the side opposite the second member formation side of the above-mentioned first member is provided with the concave part, the above-mentioned thermoplastic material is melted and ejected to the second member formation side of the first member, and the first member is changed in shape by the ejection pressure of the melted thermoplastic material, to form a convex part in the first member, whereby the second member can be formed integrally inside the convex part of the first member.

At this stage, since the above-mentioned convex part is formed by way of the ejection pressure of the thermoplastic material, it is not necessary to use the first member in which the convex part is formed in advance.

In other words, even in the case where the first member (board-like, cylindrical, for example) is used, it is possible to form the convex part at a plane or a periphery of the above-mentioned first member, and costs of the metal mould for moulding the first member etc. can be inexpensive.

Further, by changing the shape of the concave part of the above-mentioned metal mould, the convex part form can be changed easily and the composite member having a different convex shape can be obtained inexpensively.

Here, it is desirable that the above-mentioned first member is formed at a surface of the base member made of a hard material, the above-mentioned base member and the first member are mounted in the metal mould, and the thermoplastic material for the second member is melted and injected between the above-mentioned first member and a surface of the base member to change in shape the first member and to form the convex part at the first member. In this way, the first member is formed directly at the surface of the base member made of the hard material, then the thermoplastic material for the second member is melted and injected between the above-mentioned first member and the surface of the base member, to change in shape the first member and to form the convex part, whereby the composite member can be formed directly at the base member, and the attachment work can be omitted.

Further, in the method of moulding the composite member in which the first member formed of the above-mentioned elastic material is a first member moulded of a first thermoplastic material, the above-mentioned first member is mounted in the metal mould, the second thermoplastic material is melted and ejected to the one surface of the above-mentioned first member, and the second member is fusion bonded and moulded integrally to the first member, it is desirable that the concave part is provided at least at a part inside the metal mould located on the side opposite the second member fusion bonding surface of the above-mentioned first member, and the above-mentioned second thermoplastic material is melted and ejected onto the second member fusion bonding surface side of the first member, to thereby change in shape the first member by the ejection pressure of the melted second thermoplastic material and to form the convex part at the first member.

As such, since the first member and the second member are fusion bonded and moulded integrally, the first member and the second member are not separated but integral.

Further, the method of moulding the composite member in accordance with the present invention made in order to attain the above-mentioned purpose, is a method of moulding a composite member in which a first member having a bag-like part formed of an elastic material is mounted in a metal mould, a thermoplastic material for a second member is melted and ejected, and the first member and the second member are moulded inside the bag-like part of the above-mentioned first member, characterized in that a concave part is provided at least at a part inside the metal mould where an outer periphery side of the bag-like part of the above-mentioned first member is located, and the above-mentioned thermoplastic material is melted and injected into the inside of the bag-like part of the first member, to change in shape the first member by injection pressure of the melted thermoplastic material, and to form the convex part at the first member.

In this way, the concave part is provided at least at a part inside the metal mould where the outer periphery side of the bag-like part of the first member is located, the above-mentioned thermoplastic material is melted and injected into the inside of the bag-like part of the first member, and the first member is changed in shape by the injection pressure of the melted thermoplastic material, to thereby form the convex part at the first member. Further, in this case, the costs of the metal mould for moulding the first member etc. can also be inexpensive.

Furthermore, by changing the concave shape of the above-mentioned metal mould, the convex shape can be changed easily and the composite member having a different convex shape can be obtained inexpensively.

Here, it is desirable that the above-mentioned first member is formed at the surface of the base member made of the hard material, the above-mentioned base member and the first member are mounted in the metal mould, the thermoplastic material for the second member is melted and injected into the inside of the bag-like part of the above-mentioned first member, to change in shape the first member and to form the convex part at the first member.

In this way, the first member is directly formed at the surface of the base member made of the hard material, then the thermoplastic material for the second member is melted and injected into the inside of the bag-like part of the first member, the first member is changed in shape, and the convex part is formed at the first member, whereby the composite member can be formed directly at the base member, and the attachment work can be omitted.

Further, in the method of moulding the composite member in which the first member formed of the above-mentioned elastic material is a first member moulded of the first thermoplastic material, the above-mentioned first member is mounted in the metal mould, the second thermoplastic material is melted and injected into the inside of the bag-like part of the above-mentioned first member, and the second member is fusion bonded and moulded integrally to the first member, it is desirable that the concave part is provided at least at a part inside the metal mould where the outer periphery side of the bag-like part of the above-mentioned first member is located, and the above-mentioned second thermoplastic material is melted and injected into the inside of the bag-like part of the first member, the first member is changed in shape by the injection pressure of the melted second thermoplastic material and to form the convex part at the first member.

As such, since the first member and the second member are fusion bonded and moulded integrally, the first member and the second member are not separated but integral.

Further, the above-mentioned elastic material is silicone rubber, the thermoplastic material is a thermoplastic elastomer and it is desirable that hardness of the first member is greater than hardness of the second member. Furthermore, the above-mentioned first and the second thermoplastic material are thermoplastic elastomers, and it is desirable that the hardness of the first member is greater than the hardness of the second member.

Accordingly, in the case where the hardness of the first member is greater than the hardness of the second member, not only the feel of the first member but also the feel of the second member can be obtained when the above-mentioned convex part is pressed.

Further, the composite member in accordance with the present invention made in order to attain the above-mentioned purpose is a composite member in which the thermoplastic material for the second member is melted and ejected to the first member formed of the elastic material, and the first member and the second member are moulded, characterized in that the second member is formed at least at a part of one surface of the above-mentioned first member, and the convex part is formed at the above-mentioned first member by the above-mentioned second member.

As such, the first member has elasticity, and the second member is moulded at least inside the convex part of the above-mentioned first member, whereby the convex part of the above-mentioned first member is formed.

Therefore, by pressing the convex part of the first member, it is possible to obtain not only the feel of the first member but also the feel of the moulded second member, and also obtain the feel different from that in the case where it is constituted by a single member.

Here, it is desirable that the above-mentioned first member is formed at the surface of the base member formed of the hard material, the second member is formed at least at a part between the above-mentioned first member and the surface of the base member, and the convex part is formed at the above-mentioned first member by the above-mentioned second member.

Further, in the composite member in which the first member formed of the elastic material is the first member moulded of the first thermoplastic material, the second thermoplastic material is melted and ejected to the above-mentioned first member, and the second member is fusion bonded and moulded to the first member integrally, it is desirable that the second member is fusion bonded and moulded at least at a part of one surface of the above-mentioned first member and the convex part is formed at the above-mentioned first member by the above-mentioned second member.

As such, since the first member and the second member are fusion bonded and moulded integrally, the first member and the second member are not separated but integral.

Here, it is desirable that the maximum height of the convex part of the second member which forms the convex part of the above-mentioned first member is equal to or greater than twice the thickness of a film of the above-mentioned first member. Accordingly, in the case where the maximum height of the convex part of the second member is formed to have a thickness equal to or greater than twice the thickness of the film of the above-mentioned first member, it is possible to obtain the feel of the second member more.

Further, the composite member in accordance with the present invention made in order to attain the above-mentioned purpose is a composite member in which the thermoplastic material for the second member is melted and injected into the inside of the above-mentioned bag-like part of the first member which is formed of the elastic material and has the bag-like part, to mould the first member and the second member, characterized in that the second member is moulded inside the bag-like part of the above-mentioned first member, and the convex part is formed at the bag-like part of the above-mentioned first member by the above-mentioned second member.

As such, the first member has elasticity, and the second member is moulded inside the bag-like part of the above-mentioned first member, whereby the convex part of the bag-like part of the above-mentioned first member is formed.

Therefore, by pressing the convex part of the first member, it is possible to obtain not only the feel of the first member but also the feel of the moulded second member, and also obtain the feel different from that in the case where it is constituted by a single member.

Further, since the second member is formed inside the bag-like part, and since a boundary between the first member and the second member is not in contact with another member when being mounted at the another member, the first member and the second member are not separated.

Here, it is desirable that the above-mentioned first member is formed at the surface of the base member formed of the hard material, the second member is moulded inside the bag-like part of the above-mentioned first member, and the convex part is formed at the bag-like part of the above-mentioned first member by the above-mentioned second member.

Further, in the composite member in which the first member formed of the elastic material is a first member moulded of the first thermoplastic material, the second thermoplastic material is melted and injected into the inside of the above-mentioned bag-like part, and the second member is fusion bonded and moulded to the first member integrally, it is desirable that the second member is fusion bonded and moulded inside the bag-like part of the above-mentioned first member and the convex part is formed at the bag-like part of the above-mentioned first member by the above-mentioned second member.

As such, since the first member and the second member are fusion bonded and moulded integrally, the first member and the second member are not separated but integral.

Furthermore, it is desirable that the maximum thickness of the convex part of the second member formed inside the bag-like part of the above-mentioned first member is greater than a size of an opening of a bag in the first member.

Thus, in the case where the maximum thickness of the convex part of the second member is arranged to be greater than the opening size of the bag in the first member, the second member does not come out of the bag-like part, even if the first member and the second member are separated by pressing the convex part etc.

Further, it is desirable that the maximum thickness of the convex part of the second member which forms the convex part of the first member is arranged to be equal to or greater than twice the thickness of the film of the above-mentioned first member. Thus, in the case where the maximum thickness of the convex part of the second member is arranged to be equal to or greater than twice the thickness of the film of the above-mentioned first member, the feel of the second member can be obtained more.

Furthermore, it is desirable that the elastic material is silicone rubber, and the above-mentioned second thermoplastic material is a thermoplastic elastomer, and the hardness of the first member is greater than the hardness of the second member. Further, it is desirable that the above-mentioned first and the second thermoplastic materials are thermoplastic elastomers, and the hardness of the first member is greater than the hardness of the second member.

Thus, in the case where the hardness of the first member is greater than the hardness of the second member, the feel of the second member can be obtained when the above-mentioned convex part is pressed.

Advantageous Effect of the Invention

As described above, according to the present invention, a method of moulding a composite member and a composite member in which a convex part is formed at one member is provided by forming the other member at the one member.

Further, it is possible to provide a method of moulding a composite member and a composite member in which a convex part may be formed at one member by forming the other member inside the bag-like part of the one member having the bag-like part.

EXPLANATION OF REFERENCE SIGNS

Figure 1:
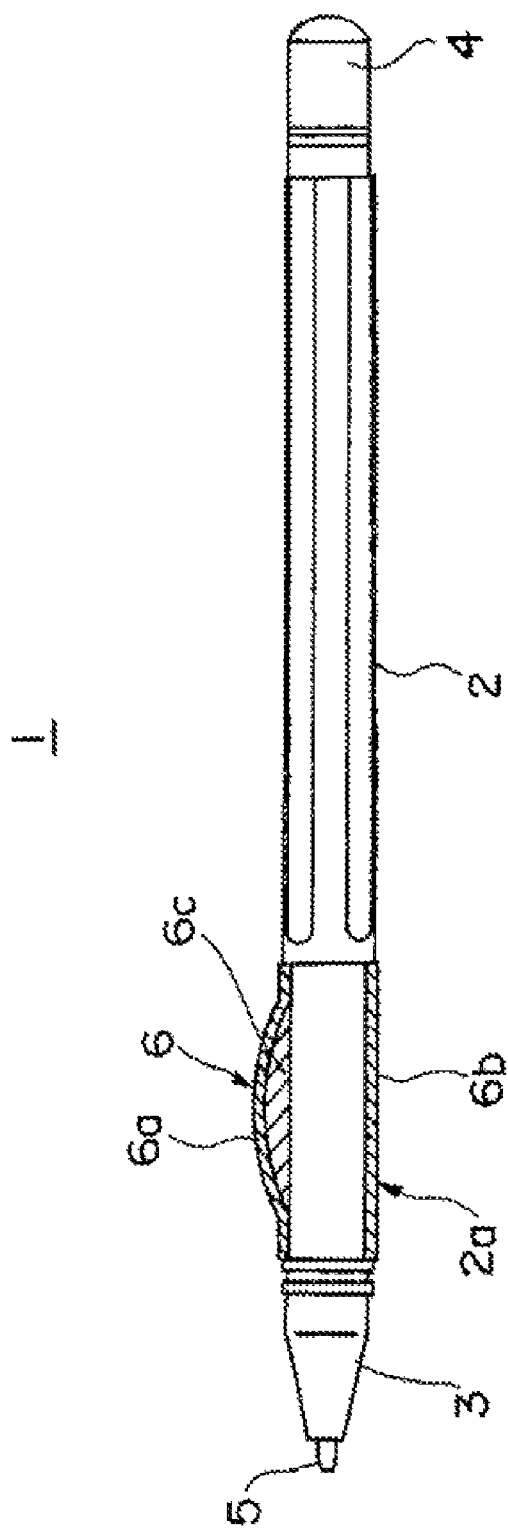
FIG. 1 is a view showing a grip as a preferred embodiment of the present invention, and it is a partial sectional view of a ball-point pen to which a grip is mounted.

1: ball-point pen
6: grip
6a: convex part
6b: first member
6c: second member
6d: ring-like convex part
7: metal mould
8: metal mould
9: metal mould
10: metal mould
10a: concave part
11: first member
12: second member
13: first member
14: second member
15: first member
16: second member
20: grip
20a: convex part
20b: bag-like part
20c: projection
20d: inner periphery
21: first member
21a: air escape hole
22: second member
30: metal mould
31: core pin
32: metal mould
33: metal mould
33a: concave part
33a1: groove
35: metal mould
37: metal would
40: base member (barrel)
35a: concave part
36: metal mould
40: base member (barrel)
G: gate

BEST MODE FOR IMPLEMENTING THE INVENTION

Hereafter, a first preferred embodiment of the present invention will be described with reference to FIGS. 1 to 3. This first preferred embodiment will be described with reference to a case where it is applied to a grip of a ball-point pen as a composite member. In addition, FIG. 1 is a side view of a ball-point pen, which is a view showing the grip in section.

Figure 2:
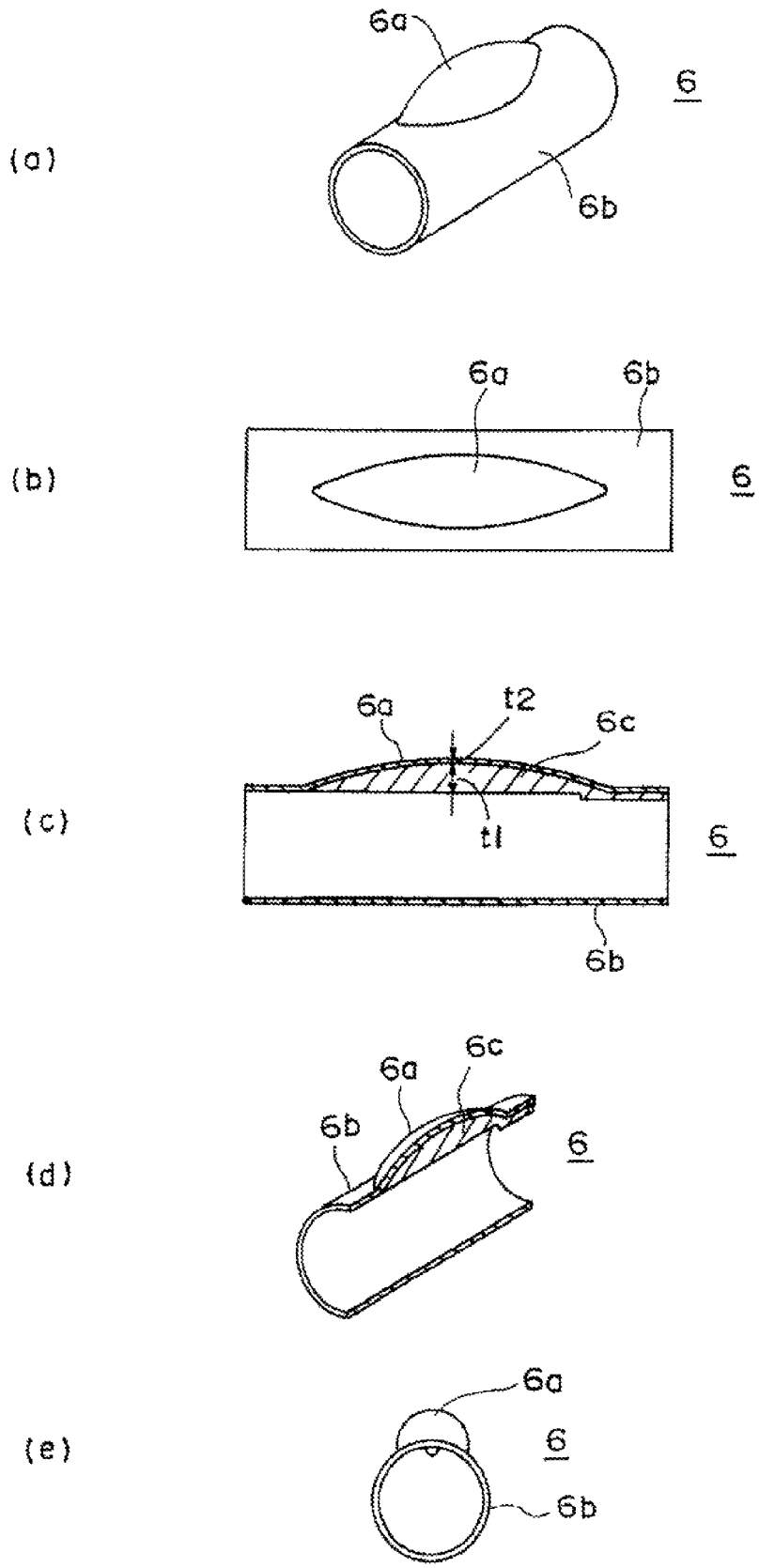
FIG. 2 is a view showing the grip as shown in FIG. 1, where (a) is a perspective view of the grip, (b) is a plan view of the grip, (c) is a sectional view of the grip, (d) is a perspective sectional view of the grip, and (e) is a front view of the grip.
Figure 3:
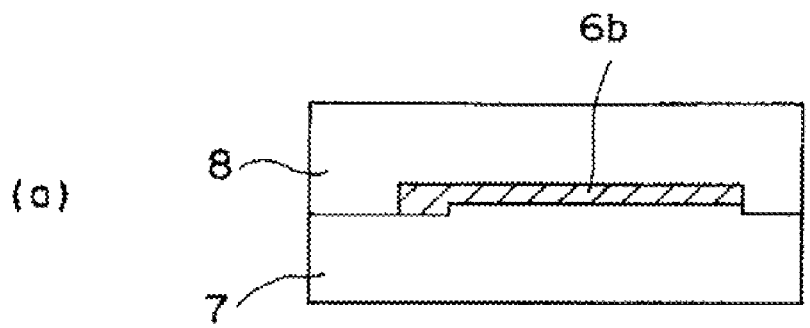
FIG. 3 is a schematic view illustrating a manufacturing process of the grip as shown in FIG. 2.
Figure 3:
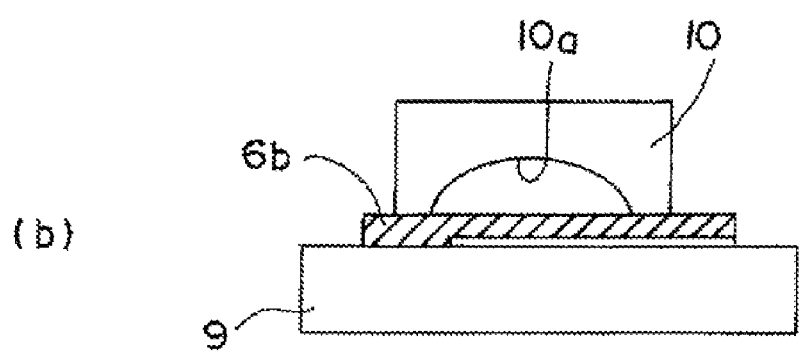
Figure 3:
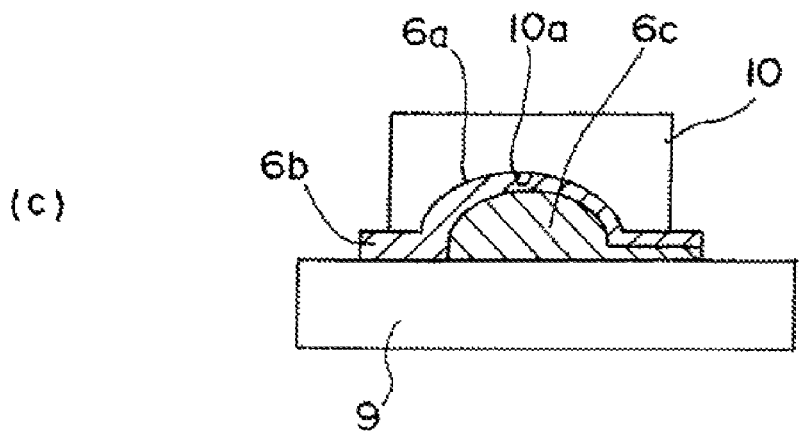

FIG. 2 is a view showing the grip, where (a) is a perspective view of the grip, (b) is a plan view of the grip, (c) is a sectional view of the grip, (d) is a perspective sectional view of the grip, and (e) is a front view of the grip. FIG. 3 is a schematic view illustrating a manufacturing process of the above-mentioned grip.

As shown in this FIG. 1, a ball-point pen 1 is constituted by a penholder 2 in which an ink refill (not shown) of the ball-point pen is accommodated, a plastic cap 3 (plastic cap) attached to a tip part of the above-mentioned penholder 2, an end cap 4 attached to a back end of the above-mentioned penholder 2, and a writing tip 5 which is formed at a tip of the above-mentioned ink refill (not shown) and includes a ball tip projecting out of the plastic cap 3.

Further, a grip 6 is mounted at a front part 2a of the above-mentioned penholder 2. This grip 6 is provided in order to improve a problem that a writing callus is formed on a finger because of the hardness of a surface of the penholder 2 when using the ball-point pen 1 for a long time, or the ball-point pen 1 is slippery due to perspiration.

This grip 6 is formed into a cylindrical shape, and a convex part 6a is formed at a part of its outer periphery. The reason of forming the convex part 6a formed at a part of the outer periphery of the grip 6 in this way is to prevent the writing callus from being formed easily and to lessen the feeling of fatigue with writing of a user.

Further, this grip 6 is constituted by a first member 6b which forms a cylindrical part and a second member 6c which forms the inside of the above-mentioned convex part 6a.

The above-mentioned first member 6b is formed by melting and moulding a first thermoplastic material A. Further, the second member 6c is formed by melting and moulding a second thermoplastic material B at a part of the inner periphery of the above-mentioned first member by way of a method to be described later. Thus, since the first member 6b and the second member 6c are fusion bonded and moulded integrally, the first member 6b and the second member 6c are not separated or peeled but integral.

This first thermoplastic material A may only be a thermoplastic elastomer which is a material having elasticity even in the solidified first member 6b. Examples of it may be a polystyrene-type elastomer (e.g., brand name: ACTYMER, manufacturer's name, RIKEN TECHNOS CORPORATION), a polyolefin-type elastomer (e.g., brand name: MILASTOMER, manufacturer's name: Mitsui Petrochemical Industries), a polyurethane-type elastomer, a polyester-type elastomer, a polyamide-type elastomer, a poly butadiene-type elastomer, an ethylene vinyl acetate-type elastomer, a polyvinyl chloride-type elastomer, a crude rubber-type elastomer, a fluoride rubber-type elastomer, a trans-polyisoprene-type elastomer, and a chlorinated polyethylene-type elastomer.

Further, the second thermoplastic material B may only be a thermoplastic elastomer which is a material having elasticity even in the solidified second member 6c. For example, it may only be a material having a fusion bonding ability with the first member among the listed materials for the first member. Furthermore, it may be an elastomer of the same type as the first material, and can also be selected in terms of changing hardness, a color, etc.

Further, in order to prevent the writing callus from being easily formed and to lessen the feeling of fatigue with writing of the user, it is preferable that the hardness of the above-mentioned first member is within a range between 20 and 70 by the Shore A hardness.

In order to prevent the writing callus from being easily formed, the grip may only be soft and it is preferable that the hardness of the first member is 70 or less by the Shore A hardness. On the other hand, if deformation in which the grip shifts axially by the pressure of tool force becomes large, a nib may not be stabilized but the feeling of fatigue may take place. Thus, it is preferable that the hardness of the first member is 20 or more by the Shore A hardness. Therefore, it is preferable that the hardness of the first member is within a range of 20-70 by the Shore A hardness.

Further, the softer the above-mentioned second member, the better the feeling. It is preferable that the hardness of the second member is 30 or less by Asker C hardness.

Furthermore, a material is preferably selected such that the hardness of the first member $6b$ which the first thermoplastic material is solidified is greater than the hardness of the second member $6c$ which the second thermoplastic material is solidified. An example of the materials having such a relationship between the hardness may be a case where the first member $6b$ is of a polystyrene-type elastomer while the second member $6c$ is of a material in which a paraffin oil ingredient ratio is increased in this polystyrene-type elastomer, for example.

As such, since the hardness of the first member $6b$ is greater than the hardness of the second member $6c$, the writing callus is not formed easily and the feeling of fatigue with writing of the user can be reduced.

In other words, since the hardness of the second member $6c$ which forms the convex part $6a$ is smaller than the hardness of the first member $6b$, an amount of deformation is large and the deformation according to gripping of a writing instrument by the user can be attained.

Further, by pressing the convex part of the first member $6b$, the feel of not only the first member $6b$ but also the fusion bonded and moulded second member $6c$ can be obtained, and the feel different from that in the case where it is constituted by a single member can be obtained.

Conversely, in the case where the hardness of the second member $6c$ is arranged to be greater than the hardness of the first member $6b$, the softness is mainly felt through the first member $6b$, and the effect of controlling the writing callus and the feel of writing fatigue is decreased.

Further, as shown in FIG. $2(c)$, the maximum thickness $t1$ of the convex part of the second member $6c$ is arranged to be equal to or greater than twice the thickness $t2$ of the film of the above-mentioned first member $6b$. This is because the feel of the second member cannot be acquired as the feel through the first member is large in the case where the maximum thickness $t1$ of the convex part of the second member $6c$ is less than twice the thickness $t2$ of the film of the above-mentioned first member $6b$.

Next, a method of moulding the above-mentioned grip will be described with reference to FIG. 3. In addition, the description will be carried out with reference to an example in which a polystyrene-type elastomer is used as the first thermoplastic material A and a polystyrene-type elastomer whose paraffin oil content is twice that of material A is used as the second thermoplastic material B.

Firstly, as shown in FIG. $3(a)$, the first thermoplastic material A is melted and injected to mould the cylindrical first member $6b$ by means of metal moulds 7 and 8.

Then, as shown in FIG. $3(b)$, a metal mould 10 in which a concave part $10a$ is formed is prepared, the second thermoplastic material B is melted and injected between the first member $6b$ and a metal mould 9, and the second member which forms the convex part of the first member $6b$ is injection moulded.

At this time, as shown in FIG. $3(c)$, the first member $6b$ changes in shape due to the injection pressure of the melted second thermoplastic material B, and the second member $6c$ is moulded inside the convex part of the first member $6b$, so that the convex part $6a$ is formed at the first member $6b$.

At this time, since the above-mentioned convex part $6a$ is formed by way of the injection pressure of the second thermoplastic material, it is not necessary to use the first member $6b$ whose convex part is formed in advance. In other words, it is not necessary to form the concave part in a metal mould 8 and to mould the first member having the convex part by means of the metal mould, for example, it is possible to use a board-like or cylindrical member as the first member, thus costs, such as for a metal mould, can be inexpensive. Further, it is possible to obtain grips having convex parts different in shape by changing the shape of the concave part $10a$ of the metal mould 10.

Figure 4:
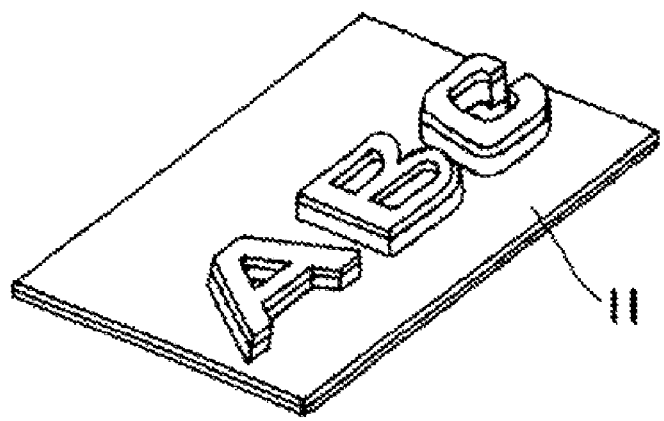
FIG. 4 is a view illustrating a modification of a preferred embodiment in accordance with the present invention.
Figure 4:
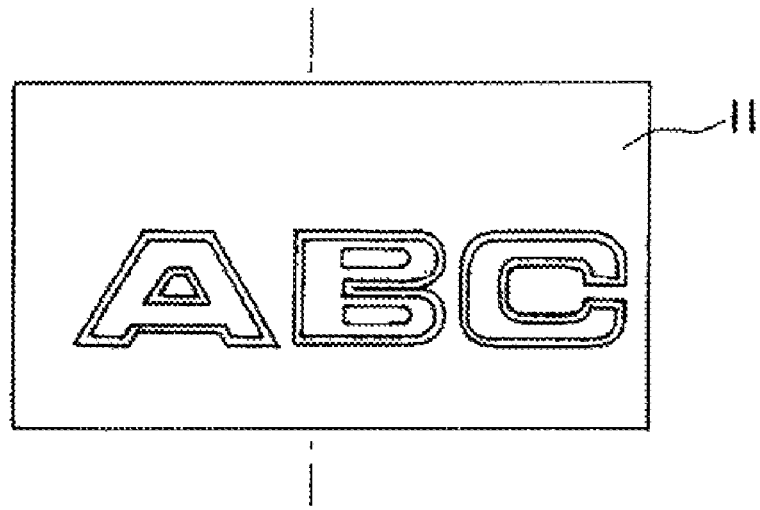
Figure 4:
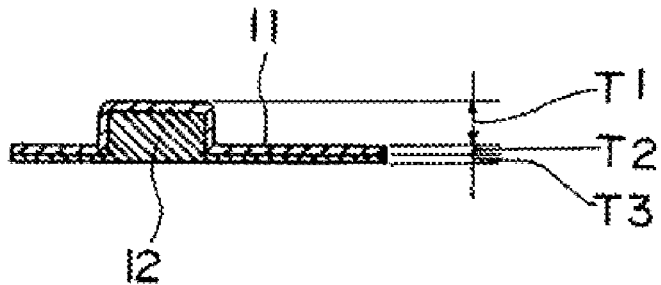

Next, a modification of the first preferred embodiment will be described with reference to FIGS. 4 and 5. The modification as shown in FIG. 4 is to a tag having formed thereon characters "ABC" as a convex part by forming the second member 12 at the board-like first member 11. In other words, it is not limited to the above-mentioned cylinder body like the grip, but it can also be applied to a board-like material.

At this time, assuming that a thickness of the convex part is T1, a thickness of the first member is T2, and a thickness of the second member is T3, it is preferable that T1>T2 in order to make an outline of the characters clear.

Further, in the case where the second member is transparently colored and the first member is transparent or translucent to the extent that a color of the second member can be seen through it, it is desirable that T1+T2>T3 in order to make a concentration difference in the characters clear since the second member looks deep according to the thickness.

Figure 5:
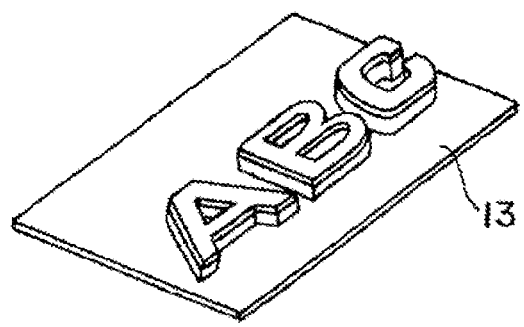
FIG. 5 is a view illustrating a modification of a preferred embodiment in accordance with the present invention.
Figure 5:
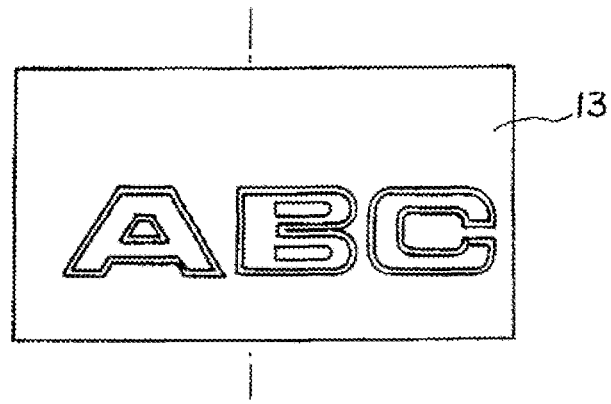
Figure 5:
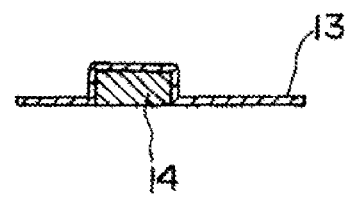
Figure 5:
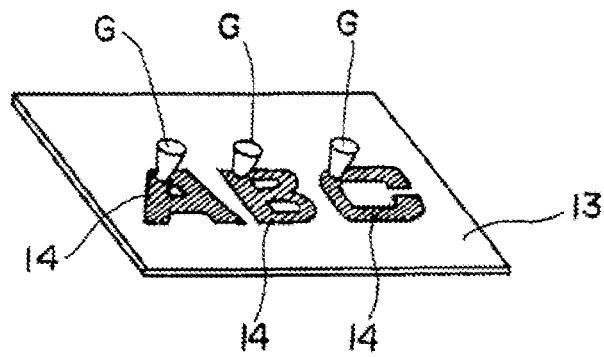

Further, although the modification as shown in FIG. 5 is to a tag having formed thereon characters "ABC" as a convex part by forming a second member 14 at a board-like first member 13 like the case as shown in FIG. 4. As shown in FIG. 4($d$), every character can be independently formed by forming a gate G for injecting the second thermoplastic material B in the position corresponding to each character.

It should be noted that although the above-mentioned description is carried out with reference to the tag, it may be applied to a manual operation button of a telephone, a key button of a keyboard, etc.

Figure 6:
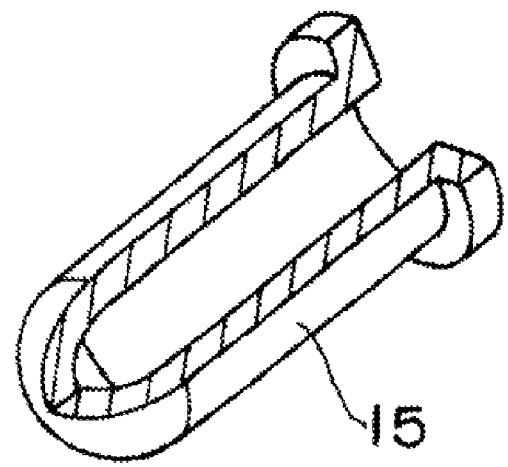
FIG. 6 is a view illustrating a modification of a preferred embodiment in accordance with the present invention.
Figure 6:
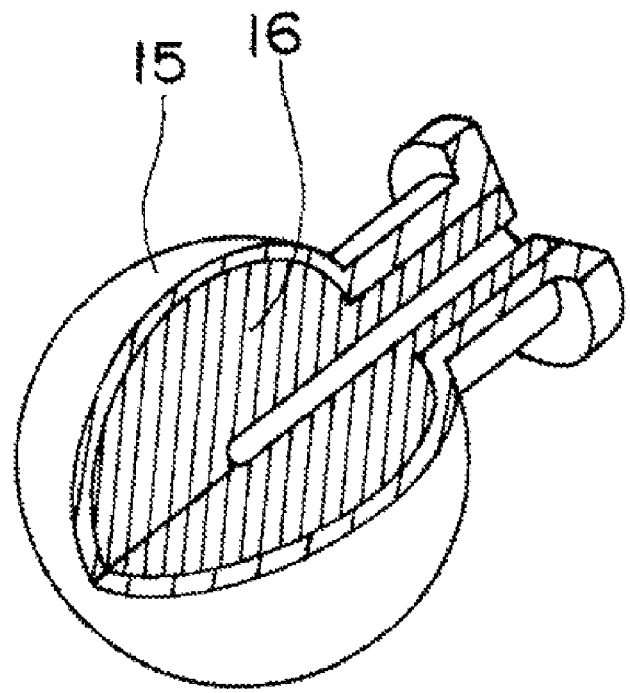

Furthermore, the modification as shown in FIG. 6 is such that the cylindrical first member 15 having a bottom is injection moulded of the first thermoplastic material as shown in FIG. 6 ($a$), then, the first member 15 is mounted to the metal mould in which a spherical concave part is formed, the second first thermoplastic material is injected into the inside of the first member 15 to mould the second member 16, and the first member 15 is made spherically. Such a thing is used for a control lever in a game machine etc., for example. In addition, by changing the concave part shape of the metal mould, the convex part shape can be changed easily and a control lever etc. having a different convex part shape can be manufactured.

Figure 7:
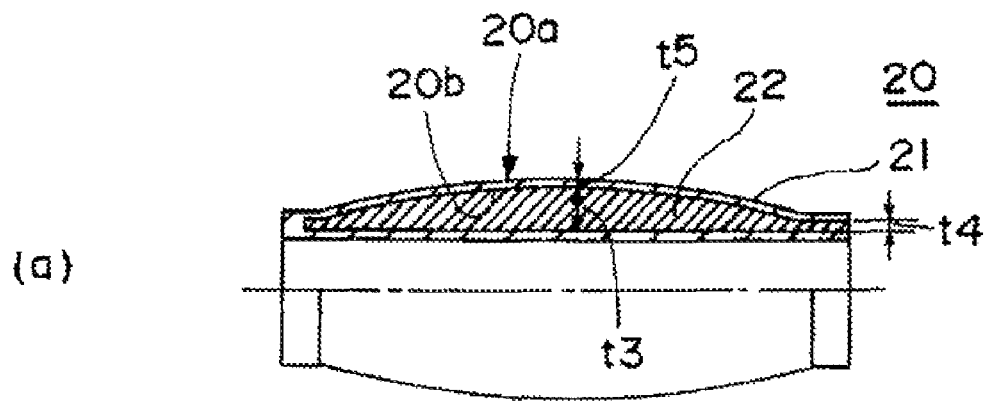
FIG. 7 is a view showing a grip as a second preferred embodiment of the present invention, where (a) is a partial sectional view of the grip, (b) is a front view of the grip, and (c) is a perspective sectional view of the grip.
Figure 7:
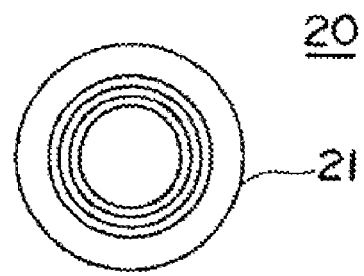
Figure 7:
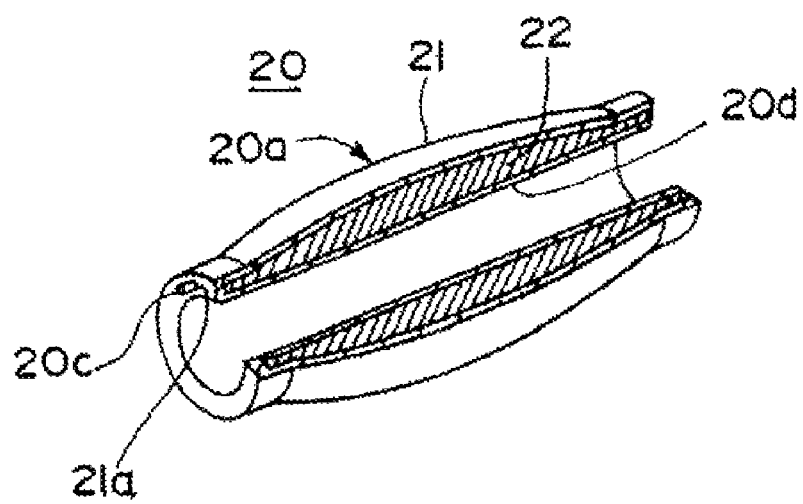
Figure 8:
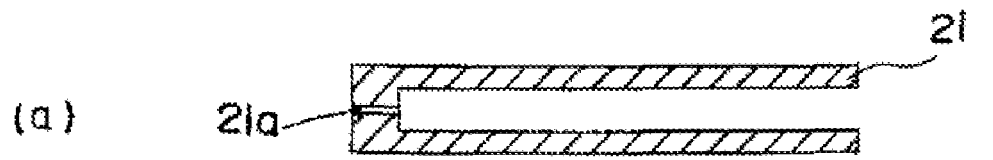
FIG. 8 is a schematic view illustrating the manufacturing process of the grip as shown in FIG. 7.
Figure 8:
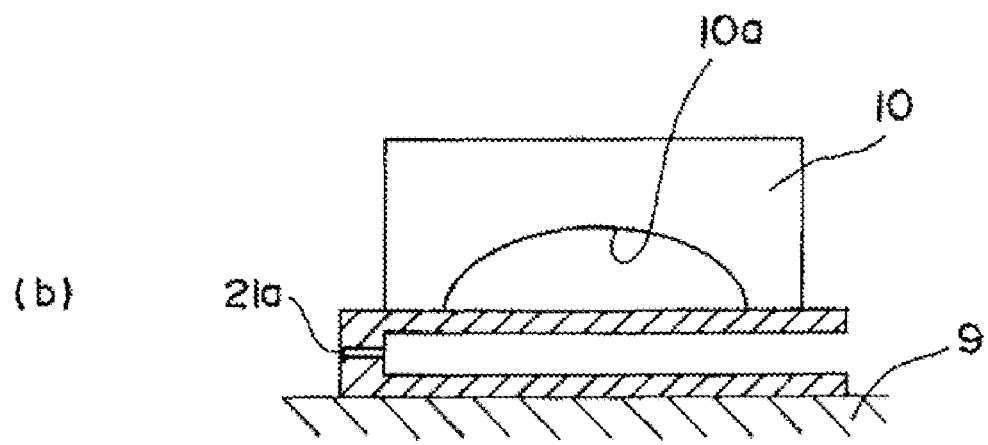
Figure 8:
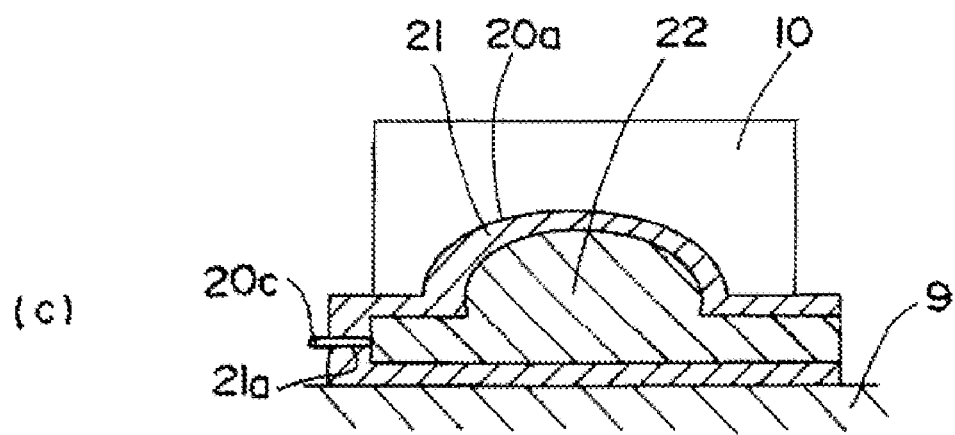

Next, a second preferred embodiment of the present invention will be described with reference to FIGS. 7 and 8. Also in the second preferred embodiment, as with the first preferred embodiment, it will be described with reference to a case where it is applied to the grip of the ball-point pen as the composite member. In addition, FIG. 7 is a view showing the grip, where (a) is a partial sectional view of the grip, (b) is a front view of the grip, (c) is a perspective sectional view of the grip. FIG. 8 is a schematic view illustrating a manufacturing process of the above-mentioned grip.

As shown in FIG. 7, this grip 20 differs from the grip 6 in the first preferred embodiment and differs in that a bag-like part 20b is formed at the first member 21 which forms the cylindrical part, and the second thermoplastic material B is melted and moulded inside the bag-like part 20b, to form a convex part 20a.

In other words, the bag-like part 20b is formed at the first member 21, and the first member 21 is changed in shape by the injection pressure of the melted second thermoplastic material, to form the convex part 20a in the first member 21, so that the second member 22 is not exposed to the inner periphery 20d of the first member 21.

Thus, since there is no boundary between the first member 21 and the second member 22 in the inner periphery 20d (since the second member 22 is not exposed to the inner periphery 20d of the first member 21), it is possible to prevent the first member 21 and the second member 22 from being separated when mounting the grip 20 to the penholder.

Further, the maximum thickness t3 of the convex part 20a of the second member 22 formed inside the above-mentioned bag-like part 20b is arranged to be greater than an opening size t4 of the bag in the first member 21.

Thus, in the case where the maximum thickness t3 of the convex part of the second member 22 is arranged to be greater than the opening size t4 of the bag in the first member 21, the second member 22 does not come out of the bag-like part 20b, even if the first member 21 and the second member 22 are separated by pressing the convex part 20a etc.

Furthermore, the maximum thickness t3 of the convex part 20a of the second member 22 is arranged to be equal to or greater than twice the thickness t5 of the film of the above-mentioned first member 21. Thus, in the case where the maximum thickness t3 of the convex part of the second member 22 is arranged to be less than twice the thickness t5 of the film of the above-mentioned first member 21, the feel of the first member 21 is dominant and the feel of the second member 22 cannot be obtained.

In addition, reference sign 20c as shown in FIG. 7(c) indicates a projection which the second thermoplastic material has flowed out of an air escape hole 21a, and solidified. This air escape hole 21a is provided in order to discharge the air in the bag-like part outside, when the melted second thermoplastic material is injected into the inside of the bag-like part 20b.

Further, since other arrangements of the grip, such as the materials which form the first member 21 and the second member 22, the hardness, etc., are the same as those of the first preferred embodiment, the description is omitted.

Next, a method of moulding the above-mentioned grip will be described with reference to FIG. 8. In addition, as described above, the description will be carried out with reference to an example in which a polystyrene-type elastomer is used as the first thermoplastic material A and a polystyrene-type elastomer whose paraffin oil content is twice that of material A is used as the second thermoplastic material B.

Firstly, as shown in FIG. 8(a), the first thermoplastic material A is melted and injected to mould the cylindrical first member 21 having the bag-like part by means of a metal mould (not shown).

Subsequently, as shown in FIG. 8(b), the metal mould 10 in which the concave part 10a is formed is prepared, the second thermoplastic material B is melted and ejected, and the second member 22 which constitutes the convex part of the first member 21 is moulded. In addition, the air in the bag-like part 20b is discharged outside through the air escape hole 21a as the second thermoplastic material B is melted and ejected.

At this time, as shown in FIG. 8(c), the first member 21 is changed in shape due to the injection pressure of the above-mentioned second thermoplastic material B, so that the convex part 20a is formed at the first member 21.

Thus, the first member 21 is changed by the injection pressure of the melted second thermoplastic material B, the second member 22 is formed integrally inside the convex part 20a of the first member 21, and the convex part 20a is formed at the first member 21.

At this time, since the above-mentioned convex part 20a is formed by way of the injection pressure of the second thermoplastic material, it is not necessary to use the first member 21 whose convex part 20a is formed in advance.

In other words, it is not necessary to form the concave part in the metal mould and to mould the first member having the convex part by means of the metal mould, for example, thus costs, such as for a metal mould, can be inexpensive.

Further, it is possible to easily change the shape of the convex part 20a by changing the shape of the concave part 10a of the metal mould 10.

Figure 9:
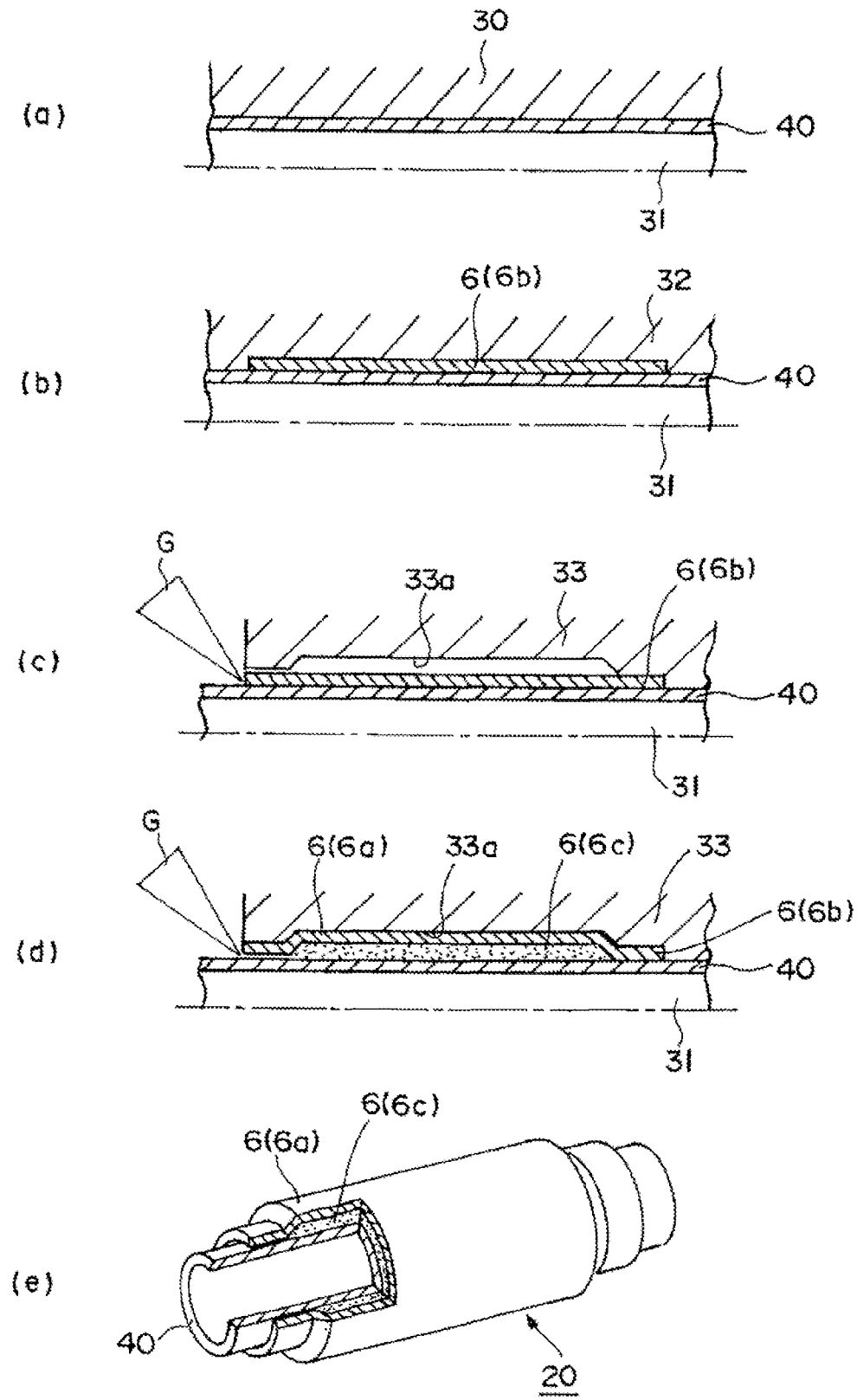
FIG. 9 is a view illustrating a third preferred embodiment, and it is a schematic sectional view showing a case where the composite member as shown in FIGS. 1 to 3 is directly formed at a base member.
Figure 10:
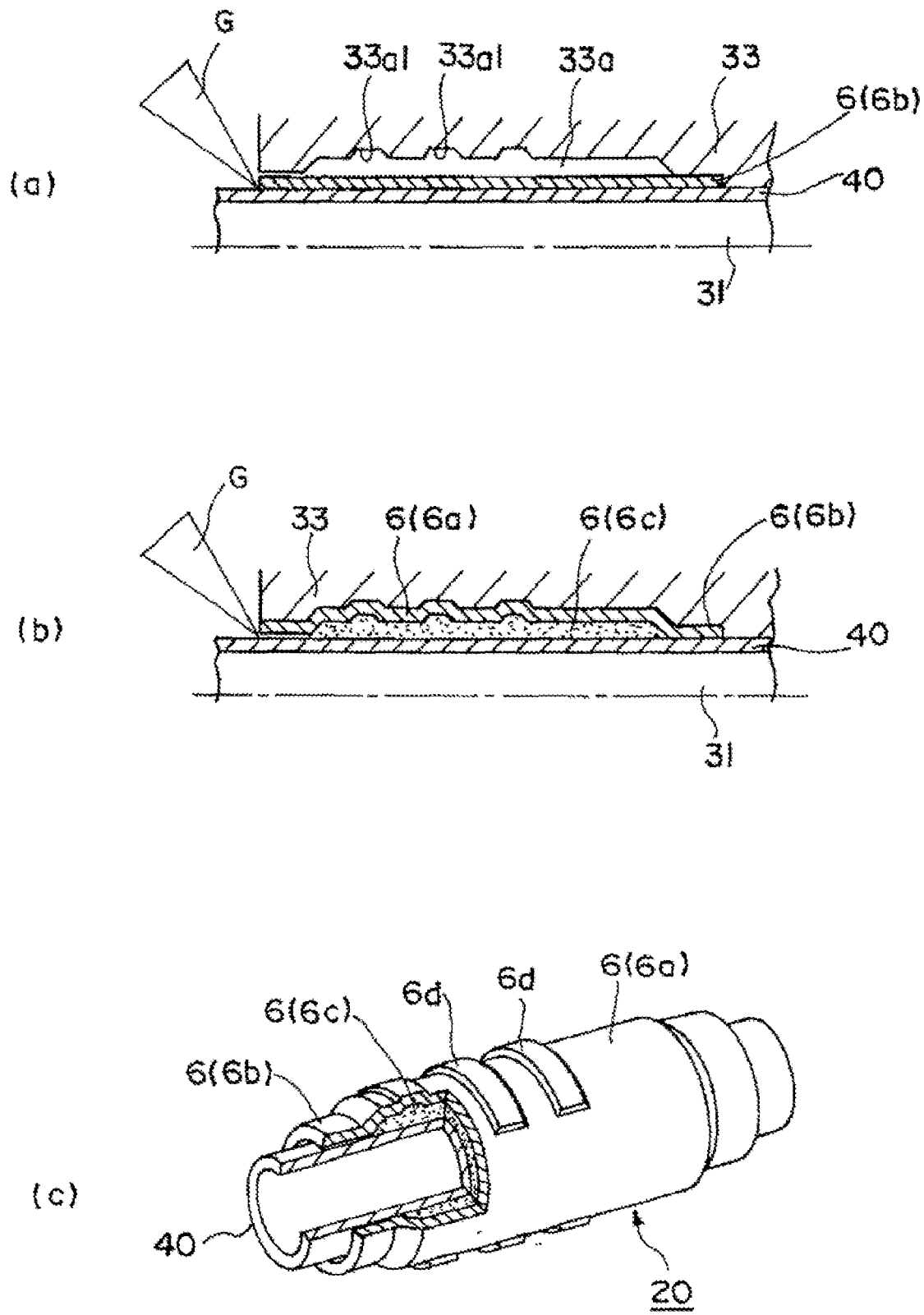
FIG. 10 is a schematic sectional view showing the modification as shown in FIG. 9.
Figure 11:
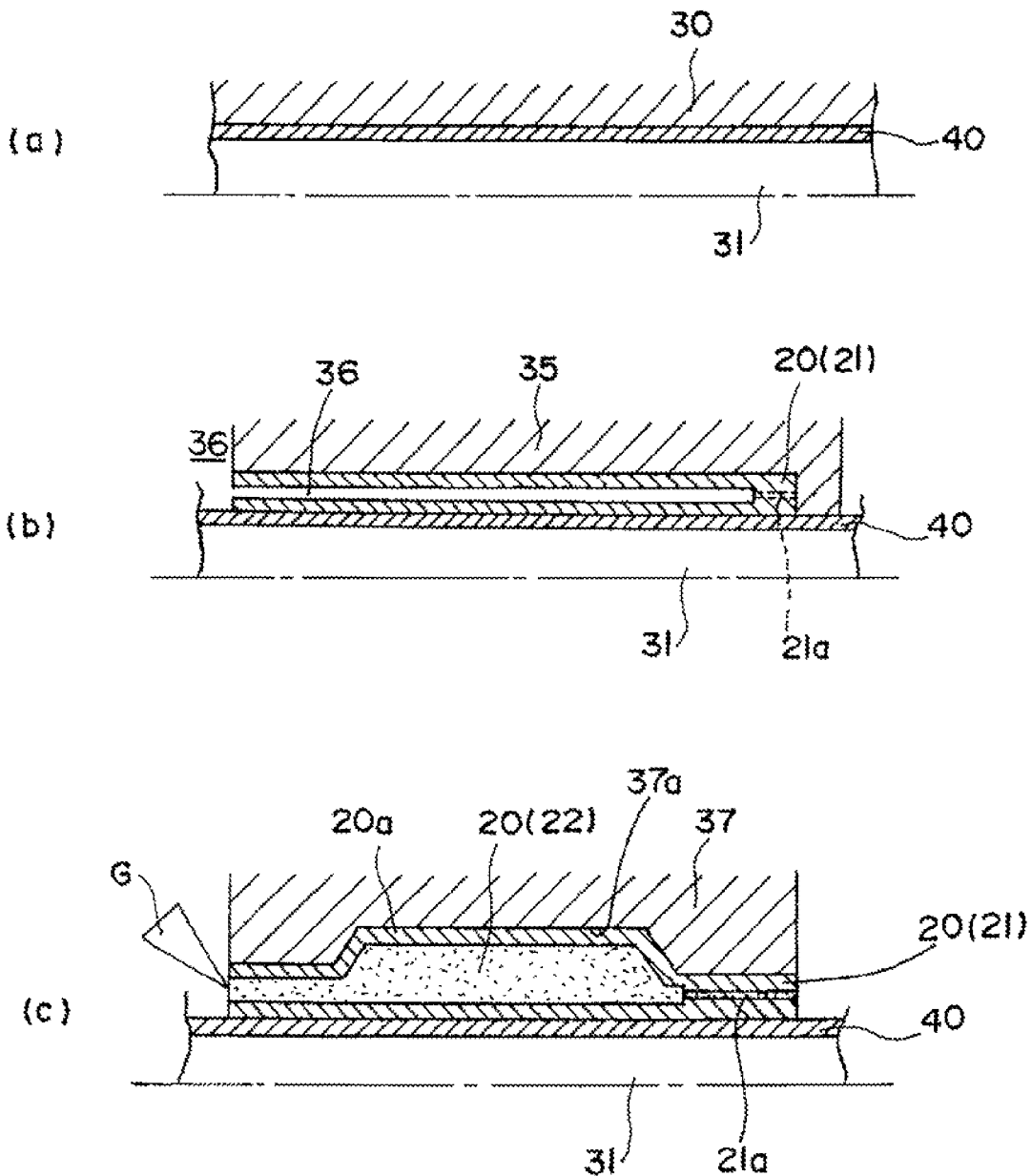
FIG. 11 is a view illustrating the third preferred embodiment, and is a schematic sectional view showing a case where the composite member as shown in FIGS. 7 and 8 is directly formed at the base member.

Furthermore, a third preferred embodiment will be described with reference to FIGS. 9 and 10. In this preferred embodiment, a feature is that the first member is directly formed at the base member. In addition, FIG. 9 is a schematic sectional view showing a case where the composite member as shown in FIGS. 1 to 3 is directly formed at the base member. FIG. 10 is a view showing a modification of a metal mould 33 as shown in FIG. 9, and FIG. 11 is a schematic sectional view showing a case where the composite member as shown in FIGS. 7 and 8 is directly formed at the base member. This preferred embodiment will also be described with reference to a case where it is applied to the grip of the ball-point pen as the composite member.

As shown in FIG. 9(a), the base member (barrel of ball-point pen) 40 is formed by using a metal mould 30 and a core pin 31 first. This barrel 40 is formed of a hard resin material. For example, polycarbonate, an acrylonitrile butadiene styrene resin, an acrylonitrile styrene resin, polystyrene, a methacrylic resin, polyacetal, etc. can be used.

Subsequently, by using a metal mould 32, the first member 6b which constitutes the grip 6 is formed at an outer periphery of the above-mentioned barrel 40 (FIG. 9(b)). At this time, the above-mentioned first member 6b is formed at the outer periphery of the above-mentioned barrel 40. The first member 6b formed at the outer periphery of this barrel 40 is not fusion bonded to the barrel 40 but formed in an adhesion state.

Then, using the metal mould 33 in which a concave part 33a is formed, the thermoplastic material for the second member 6c is melted and injected through the gate G between the above-mentioned base member 40 and the first member 6b; to swell and mould the first member 6b (FIGS. 9(c), (d)). In addition, the material used in the first preferred embodiment is used for the above-mentioned first member 6b and the second member 6c.

At this time, as the first member 6b formed at the barrel 40 in the adhesion state is separated by the injection pressure of the thermoplastic material for the above-mentioned second member 6c, the second member is filled between the barrel 40 and the first member 6b. Then, by the injection pressure of the above-mentioned second member 6c, the first member 6b changes in shape and the convex part 6a is formed along the concave part 33a of the metal mould 33. In addition, as shown in FIG. 9(d), the end of the first member is maintained at an adhesion state with the base member 40.

After the moulding, the metal mould 33 and the core pin 31 are removed, and the base member (barrel of ball-point pen) 40 in which the grip 6 is formed at the outer periphery is taken out (FIG. 9(e)).

In this way, the first member 6b is directly formed at the surface of the base member (barrel) 40 made of the hard material. Then, the thermoplastic material for the second member 6c is melted and injected between the above-mentioned first member 6b and the surface of the base member, to change in shape the first member 6b and form the convex part 6a at the first member 6b, whereby the composite member (grip) 20 can be directly formed at the base member (barrel) 40, and the attachment work can be omitted.

Further, since the composite member (grip) 20 is directly formed at the base member (barrel) 40, the composite member (grip) 20 can be easily taken out by taking the base member (barrel) 40 from the metal mould, compared with the case where the composite member (grip) 20 is independently moulded.

Furthermore, since the composite member (grip) 20 is not in contact with the core pin 31, it does not adhere to the core pin 31. As a result, it can be taken out, without forming creases etc. at the composite member (grip) 20. Further, also in the case where the more elastic composite member (grip) 20 is moulded, the composite member (grip) 20 can be taken out of the metal mould in a good state.

In addition, in the above-mentioned preferred embodiment, as shown in FIG. 9(c) and FIG. 9(d), the first member 6b which constitutes the grip 6 is formed at the outer periphery of the above-mentioned barrel 40 by means of the metal mould 32. Then, the thermoplastic material for the second member 6c is melted, injected, and moulded by means of the metal mould 33 in which the concave part 33a is formed. In this way, a convex part surface of the moulded composite member (grip) 20 is formed into a flat and smooth surface.

Now, as shown in FIG. 10, a groove 33a1 is formed at the concave part 33a of this metal mould 33, the first member 6b which constitutes the grip 6 is formed like the above-described case. Then, the thermoplastic material for the second member 6c is melted and injected, and moulded by means of the metal mould 33 in which the concave part 33a is formed (FIGS. 10 (a), (b)). Accordingly, a ring-like convex part 6d is formed at the convex part surface of the molded composite member (grip) 20 corresponding to the above-mentioned groove 33a1 (FIG. 10(c)).

Thus, by changing in shape the concave part 33a of the metal mould 33, the composite members (grips) 20 having the convex part surfaces in various shapes can be obtained.

Further, a case where the composite member as shown in FIGS. 7 and 8 is directly formed at the base member (barrel) will be described with reference to FIG. 11. As with the case shown in FIG. 9, the base member (barrel of ball-point pen) 40 is moulded by using the metal mould 30 and the core pin 31. This barrel 40 is formed of the hard resin material (FIG. 11(a)).

Subsequently, by using metal moulds 35 and 36, the first member 21 which constitutes the grip 20 is formed at the outer periphery of the above-mentioned barrel 40. At this time, the above-mentioned first member 21 is formed at the outer periphery of the above-mentioned barrel 40. In addition, the air escape hole 21a is formed at the end of this first member 21 (FIG. 11(b)).

Then, using a metal mould 37 in which a concave part 37a is formed, the thermoplastic material for the second member 22 is melted and injected between the first member 21 through the gate G to carry out the moulding. At this time, the air between the first member 21 is discharged from the above-mentioned air escape hole 21a (FIG. 11(c)).

Then, after the moulding, the metal mould 37 and the core pin 31 are removed, and the base member (barrel of a ball-point pen) 40 in which the grip 20 is formed at the outer periphery is taken out.

In this way, the first member 21 is directly formed at the surface of the base member 40 made of the hard material, then the thermoplastic material for the second member 22 is melted and injected into the inside of the bag-like part of the above-mentioned first member 21, to change in shape the first member 21, and the convex part 20a is formed at the first member 21, whereby the composite member (grip) 20 can be directly formed at the base member (barrel) 40, and the attachment work can be omitted.

Further, since the composite member (grip) 20 is directly formed at the base member (barrel) 40, the composite member (grip) 20 can be easily taken out by taking the base member (barrel) 40 from the metal mould, compared with the case where the composite member (grip) 20 is independently moulded.

Furthermore, since the composite member (grip) 20 is not in contact with the core pin 31, it does not adhere to the core pin 31. As a result, it can be taken out, without forming creases etc. at the composite member (grip) 20. Further, also in the case where the more elastic composite member (grip) 20 is moulded, the composite member (grip) 20 can be taken out of the metal mould in a good state.

In addition, in the above-described preferred embodiment, although the thermoplastic material used for the material of the first member and the second member is illustrated by way of example, the first member may only be formed of an elastic material. For example, silicone rubber can be used. If this is the case, the thermoplastic material, such as for example a thermoplastic elastomer, is used for the material for the second member.

INDUSTRIAL APPLICABILITY

The method of moulding the composite member and the composite member in accordance with the present invention are widely used in all fields for which plastic members including a grip of a writing instrument, a tag, a manual operation button of a telephone, a control lever of a game machine, and a key of a keyboard are used.

The invention claimed is:

1. A grip of a writing instrument having a first member and a second member which are directly formed at a barrel, comprising:

the first member formed of a material having elasticity in a solidified state and moulded in an adhesion state at a surface of the barrel formed of a hard material; and the second member moulded by melting and ejecting a thermoplastic material at least to a part between the surface of the barrel and the first member moulded in an adhesion state at the surface of said barrel, characterized in that an end of said first member is kept in the adhesion state on the surface of the barrel, said second member is in contact with the surface of the barrel, and a convex part is formed at least at a part of an outer periphery of said first member by said second member.

2. The grip of a writing instrument according to claim 1, characterized in that said first member is formed of a first thermoplastic material and the second member is formed of a second thermoplastic material; and said second member is fusion bonded and moulded integrally to the first member.

3. The grip of a writing instrument according to claim 1 or 2, characterized in that the maximum height of the convex part of the second member which forms the convex part of said first member is equal to or greater than twice the thickness of a film of said first member.

4. The grip of a writing instrument according to claim 1, characterized in that the first member is silicone rubber, the second member is a thermoplastic elastomer, and hardness of the first member is greater than hardness of the second member.

5. The grip of a writing instrument according to claim 2, characterized in that said first and second thermoplastic materials are thermoplastic elastomers, and hardness of the first member is greater than hardness of the second member.

\* \* \* \* \*